May 9, 1961 F. S. MIZUSAWA 2,983,075
APPARATUS FOR SUPPLYING CHEMICALS TO IRRIGATION SYSTEMS
Filed July 20, 1959 2 Sheets-Sheet 1

INVENTOR.
FRANK S. MIZUSAWA
BY
ATTORNEYS

INVENTOR.
FRANK S MIZUSAWA
BY
Lyon & Lyon
ATTORNEYS

United States Patent Office 2,983,075
Patented May 9, 1961

2,983,075

APPARATUS FOR SUPPLYING CHEMICALS TO IRRIGATION SYSTEMS

Frank S. Mizusawa, 11905 E. Westminster, Garden Grove, Calif.

Filed July 20, 1959, Ser. No. 828,166

5 Claims. (Cl. 47—1)

This invention relates to apparatus for supplying chemicals to irrigation systems, and included in the objects of this invention are:

First, to provide an apparatus which is adapted to be mounted in an irrigation ditch at the point of delivery of water to the distributing ditches through which water is supplied to an area to be irrigated, and which is operated by the flow of water to meter a proportionate amount of chemical such as fertilizer or other additives to the irrigation water.

Second, to provide an apparatus for supplying chemicals to irrigation systems which is capable of a wide range of adjustment so that chemical-to-water ratio may be adjusted for the particular chemical to be introduced as well as rate of flow of the irrigation water.

Third, to provide an apparatus of this type which is readily and quickly set up in an irrigation system and moved from place to place as different areas are irrigated, and which, when set up, operates automatically without attention.

With the above and other objects in view, as may appear hereinafter, reference is directed to the accompanying drawings in which.

Figure 1:
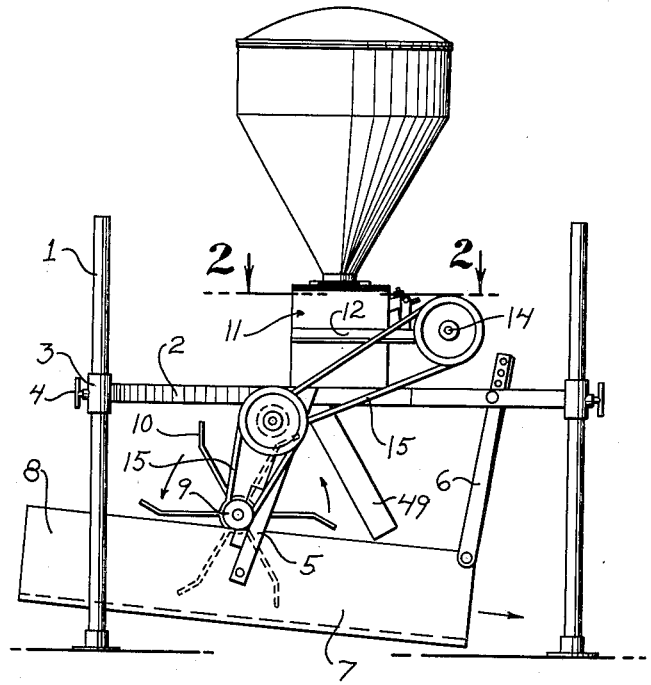
Figure 1 is a side view of the apparatus.
Figure 2:
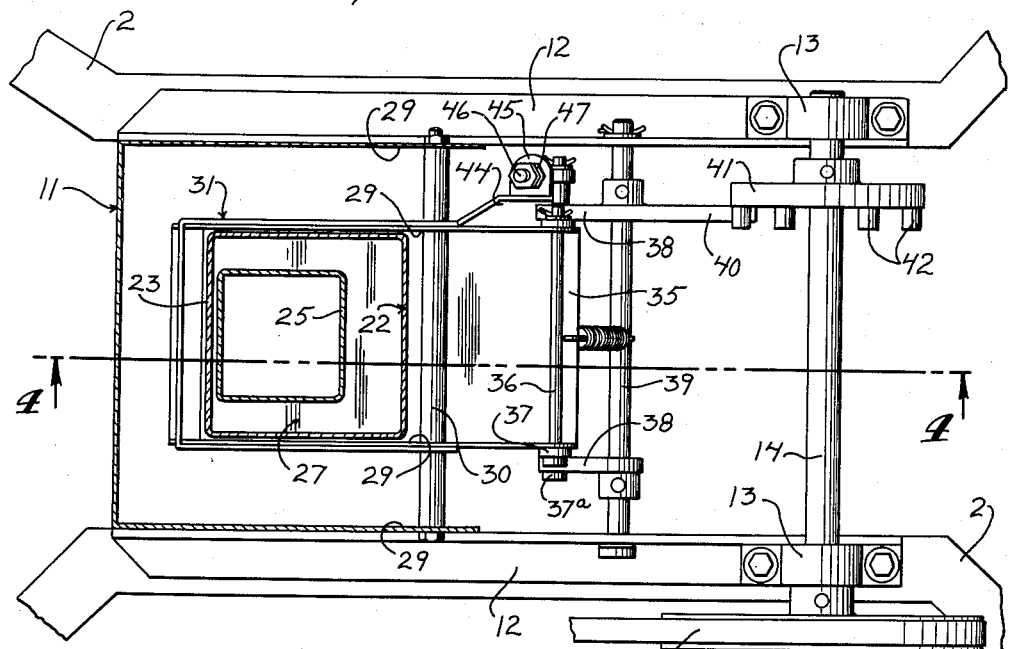
Figure 2 is enlarged, fragmentary, sectional view taken through 2—2 of Figure 1.
Figure 3:
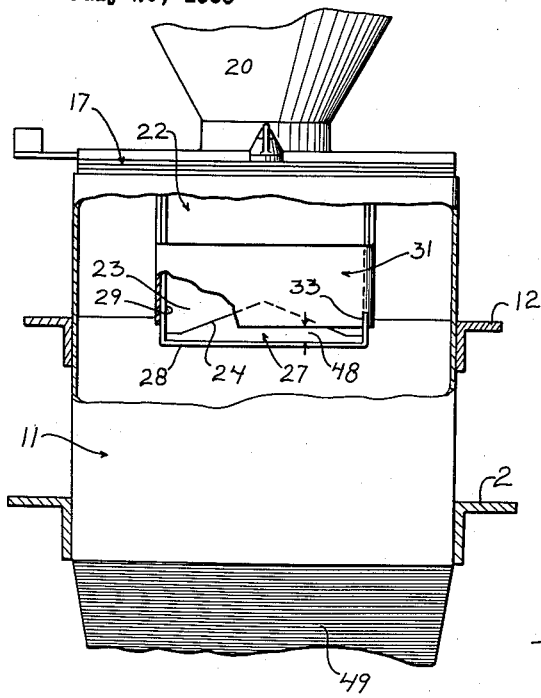
Figure 3 is a fragmentary, partial sectional, partial elevational view thereof taken through 3—3 of Figure 4.

The apparatus for supplying chemicals to irrigation systems is adapted to be mounted in an appropriate place within an irrigation system by means of four posts 1 which support a frame 2, the extremities of which diverge outwardly and terminate in sleeves 3 which fit slidably on the posts 1 and have set screws 4 to secure the sleeves to the posts 1.

Extending downwardly from the frame 2 are suspension straps 5 and 6 which are attached to the sides of a channel-shaped sluice box 7. The suspension straps may be so arranged that the location of the sluice box 7 may be adjusted. The sluice box is provided with a flared upstream end 8. The suspension straps 5 support a pair of bearings 9 connected by a shaft on which is mounted a paddle wheel 10 disposed so as to be rotated by the flow of water through the sluice box 7.

Substantially centrally mounted on the frame 2 is a housing 11 which is substantially rectangular in form. Extending horizontally from opposite sides of the housing 11, parallel with the frame 2, is a pair of beams 12 which support bearings 13. The bearings 13 journal a shaft 14 which is connected by pulley and drive belt means 15 with the paddle wheel 10. The operation of the shaft 14 will be brought out in more detail hereinafter.

The housing 11 includes a horizontal top side 16 which is covered by a plate 17. The plate is connected to the top side by a hinge 18 and is adapted to be locked in place by means of a bolt and thumb screw 19. The plate 17 supports the lower and smaller end of a hopper 20 having upwardly diverging walls. Slide gate means 21 may be incorporated in the lower end of the hopper 20 so that flow of the contents of the hopper may be shut off whenever desired.

Depending from the top side 16 of the housing 11 is a measuring shell 22 which is rectangular or square in plan, that is, is provided with substantially vertical side walls. The lower extremity of the measuring shell defines a plane sloping upwardly and rearwardly with respect to the plate 17. The forward wall 23 of the measuring shell 22 is provided with a notched lower end 24.

The measuring shell 22 is dimensioned to contain the maximum amount of chemical to be dispensed in a single cycle of operation. In order to measure smaller quantities of chemical, any one of a series of graduated smaller measuring shells 25 may be set within the measuring shell 22. The smaller or inside measuring shell 25 depends from a plate 26 which may be set over the plate 17.

Disposed within the housing 11, under the measuring shell 22, is a primary gate or trough 27 having a bottom wall 28 inclined upwardly and rearwardly in conformity to the lower edge of the measuring shell 22. The primary gate 27 also includes side walls 29 which extend upwardly along the sides of the measuring shell 22.

At a point beyond the rearward side of the measuring shell 22, the primary gate or trough 27 is journaled on a fulcrum shaft 30 which extends through and is supported by the side walls 29 of the housing 11. Also fulcrumed on the shaft 30 is a secondary gate or metering gate 31 which includes a cross wall 32 disposed forwardly of the forward wall 23 and arranged so that its lower edge may rest on, or may be spaced a predetermined distance from, the bottom wall 28 of the primary gate or trough 27.

The cross wall 32 is provided with notches 33 to clear the side walls 29, and the extremities of the cross wall 32 are joined to side walls 34 which extend alongside the side walls 29 and constitute the means whereby the secondary gate or metering gate 31 is journaled on the fulcrum shaft 30.

The primary gate or trough 27 extends beyond the fulcrum shaft 30 to form a channel-shaped lever arm 35 which is connected by a pin 36 to a pair of downwardly extending links 37. These links are joined by pins 37a to a pair of lever arms 38, which are joined to a fulcrum shaft 39 extending between the beams 12 which project rearwardly from the housing 11. One of the lever arms 38 is provided with a trip arm 40 which extends rearwardly toward the shaft 14.

Mounted on the shaft 14 is a wheel 41 having a ring of pins 42 extending parallel with the shaft 14. The pins 42 are adapted to engage the trip arm 40 to cause oscillation of the trip arm and corresponding movement of the primary gate or trough 27. A spring 43 extending between the exremity of the lever arm 35 of the primary gate 27 and the shaft 39 operates in a direction to yieldably maintain the bottom wall 28 against the lower end of the measuring shell 22.

One of the side walls 34 of the secondary gate or metering gate 31 extends to form an arm 44 disposed alongside the lever arm 35. The extremity of this arm is provided with a lateral boss 45 through which extends a rod 46. The rod 46 protrudes above the boss 45 and is provided with adjustment nuts 47. The lower end of the rod 46 extends downward and is pivotally connected to one of the pins 37a. Adjustment of the nuts 47 tilts the secondary gate or metering gate 31 relative to the primary gate or trough 27 so as to open or close the space 48 between the lower edge of the cross wall 32 and the bottom wall 28.

Extending from the lower side of the housing 11 is a chute 49 which carries material discharged from the measuring shell 22 downwardly and directs the material into the sluice box 7 downstream of the paddle wheel 10.

Operation of the apparatus for supplying chemicals to irrigation systems is as follows:

The apparatus is placed in a suitable location within an irrigation system. This may be the point at which water is supplied from a main irrigation channel or from a pipe line. The sluice box 7 is positioned so as to receive the water from such source. This is accomplished by adjustment of the posts 1 and frame 2. In some instances dirt or mud may be placed around the sluice box so that the water flow is properly directed. The sluice box may also be mounted at any point along an irrigation channel.

Figure 4:
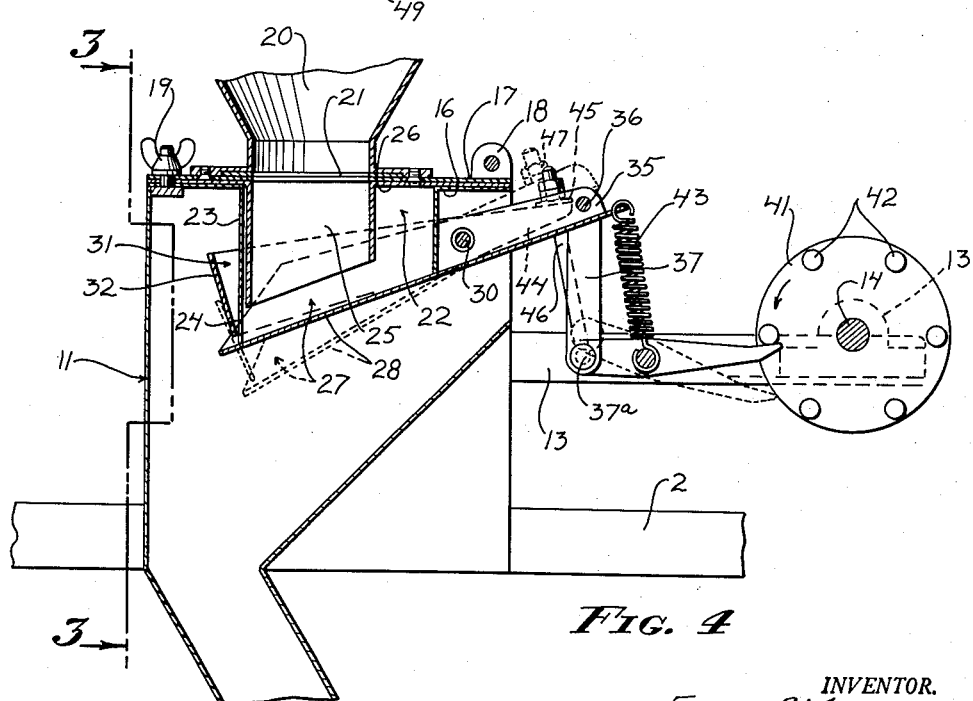
Figure 4 is a fragmentary, sectional view thereof taken through 4—4 of Figure 2.

Rotation of the paddle wheel 10 drives the shaft 14 and wheel 41 which causes the trip pins 42 to engage the arm 40. The oscillating motion of the trip arm 40 is transmitted through the links 37 to the primary gate or trough 27 so that the trough is caused to move between an upper position closing the lower end of the measuring shell 22 and a lower position such as indicated by dotted lines in Figure 4. During the interval that the primary gate or trough 27 clears the lower end of the measuring shell 22, material from the measuring shell 22 is discharged downwardly into the chute 49.

Adjustment of the quantity of material or the proportion of material to the irrigation water flowing through the sluice box 7 may be obtained in several ways. First, the number of trip pins 42 may be increased or decreased; second, the spacing of the slot 48 may be increased or decreased; third, the effective volume of the measuring shell 22 may be varied by insertion of smaller measuring shells 25 of different dimensions. In the latter case, removal or change in the size of the smaller measuring shells 25 is accomplished by loosening the thumb screw 19 and tilting the separator about the hinge 18.

It will be noted that the rate at which material is discharged into the chute 49 is dependent upon and bears a relation to the rate of flow through the sluice box 7. That is, if the rate of flow through the sluice box 7 increases, the paddle wheel 10 rotates faster so that the chemical is supplied at a faster rate. Thus the amount of chemical supplied to the irrigation water tends to remain constant even though the rate of flow of the irrigation water may vary.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An apparatus for supplying chemicals to irrigation systems, comprising: a frame structure; a set of vertically adjustable legs for supporting said frame over an irrigation stream; a sluice box suspended from said frame to direct and channel the flow of said irrigation stream; a hopper for irrigation additives supported by said frame structure; a measuring shell depending from said hopper and defining an inclined open lower side; a channel-shaped primary gate forming an inclined bottom normally closing said lower side; a secondary gate closing the lower end of said primary gate; means for adjusting the relative positions of said gates to define a variable discharge opening; and means for pivoting said gates to discharge said additives downward from said measuring shell.

2. An apparatus for supplying chemicals to irrigation systems, comprising: a frame structure; a set of vertically adjustable legs for supporting said frame over an irrigation stream; a sluice box suspended from said frame to direct and channel the flow of said irrigation stream; a hopper for irrigation additives supported by said frame structure; a measuring shell depending from said hopper and defining an inclined open lower side; a channel-shaped primary gate forming an inclined bottom normally closing said lower side; a secondary gate closing the lower end of said primary gate; means for adjusting the relative positions of said gates to define a variable discharge opening; means for pivoting said gates to discharge said additives downward from said measuring shell; and drive means for said operating means including means responsive to the flow of water in said irrigation stream.

3. An apparatus for supplying chemicals to irrigation systems, comprising: a frame structure; a set of vertically adjustable legs for supporting said frame over an irrigation stream; a sluice box suspended from said frame to direct and channel the flow of said irrigation stream; a hopper for irrigation additives supported by said frame structure; a measuring shell depending from said hopper and defining an inclined open lower side; a channel-shaped primary gate forming an inclined bottom normally closing said lower side; a secondary gate closing the lower end of said primary gate; means for adjusting the relative positions of said gates to define a variable discharge opening; and drive means for said operating means including means responsive to flow of water in said sluice box.

4. An apparatus for supplying chemicals to irrigation systems, comprising: a frame structure; a hopper for irrigation additives supported by said frame structure; a measuring shell depending from said hopper and defining an inclined open lower side; a channel-shaped primary gate forming an inclined bottom normally closing said lower side; a secondary gate closing the lower end of said primary gate; means for adjusting the relative positions of said gates to define a variable discharge opening; means for pivoting said gates to discharge said additives downward from said measuring shell; and means for directing the additives discharged from said gates into an irrigation stream.

5. An apparatus for supplying chemicals to irrigation systems, comprising: a frame structure; a hopper for irrigation additives supported by said frame structure; selective measuring shells depending from the lower end of said hopper and open at their lower ends; a channel-shaped gate forming an inclined bottom normally closing said measuring shells; means for pivoting said gate periodically to permit flow of said additives from the selected measuring shell; means for regulating the rate of flow of said additives from said gate; and means for directing the additives discharged from said gate into an irrigation stream.

References Cited in the file of this patent

UNITED STATES PATENTS

| | | |
|---|---|---|
| 1,868,914 | Prizer | July 26, 1932 |
| 2,579,859 | Prizer | Dec. 25, 1951 |
| 2,626,482 | Munday | Jan. 27, 1953 |